United States Patent [19]
Leitzel

[11] Patent Number: 6,103,651
[45] Date of Patent: Aug. 15, 2000

[54] HIGH DENSITY CERAMIC METAL COMPOSITE EXHIBITING IMPROVED MECHANICAL PROPERTIES

[75] Inventor: Timothy A. Leitzel, Pennsylvania Furnace, Pa.

[73] Assignee: North American Refractories Company, Cleveland, Ohio

[21] Appl. No.: 08/597,950

[22] Filed: Feb. 7, 1996

[51] Int. Cl.$^7$ .............................. C04B 35/10; C04B 35/03
[52] U.S. Cl. ...................... 501/128; 501/108; 501/109; 501/118; 501/119; 501/121; 501/122; 501/127; 501/130; 501/131; 501/153; 501/154
[58] Field of Search ................................ 501/88, 89, 102, 501/103, 104, 109, 108, 118, 119, 121, 122, 127, 128, 130, 153, 154

[56] References Cited

U.S. PATENT DOCUMENTS

| | | | |
|---|---|---|---|
| 3,862,846 | 1/1975 | Smoak et al. | 501/151 |
| 4,007,020 | 2/1977 | Church et al. | 51/295 |
| 4,061,501 | 12/1977 | Ivarsson et al. | 501/118 |
| 4,077,808 | 3/1978 | Church et al. | 501/80 |
| 4,208,214 | 6/1980 | Stein et al. | 501/109 |
| 4,276,091 | 6/1981 | Cassens, Jr. | 501/118 |
| 4,419,133 | 12/1983 | Shubow et al. | 501/118 |
| 4,485,150 | 11/1984 | Tsuno | 428/633 |
| 4,824,625 | 4/1989 | Claar et al. | 264/126 |
| 4,849,266 | 7/1989 | Dwivedi et al. | 428/34.4 |
| 4,900,698 | 2/1990 | Lundsager | 501/80 |
| 4,956,137 | 9/1990 | Dwivedi et al. | 501/127 |
| 4,956,319 | 9/1990 | Dwivedi et al. | 501/127 |
| 5,007,475 | 4/1991 | Kennedy | 164/97 |
| 5,045,512 | 9/1991 | Lange et al. | 501/96 |
| 5,091,346 | 2/1992 | Inoue et al. | 501/93 |
| 5,143,540 | 9/1992 | Pyzik et al. | 75/233 |
| 5,158,916 | 10/1992 | Claussen | 501/127 |
| 5,167,271 | 12/1992 | Lange et al. | 164/103 |
| 5,215,666 | 6/1993 | Kuszyk et al. | 222/591 |
| 5,356,842 | 10/1994 | Yamakawa et al. | 501/87 |
| 5,523,150 | 6/1996 | Numata et al. | 428/307.7 |
| 5,525,560 | 6/1996 | Yamazaki et al. | 501/103 |
| 5,607,887 | 3/1997 | Pejryd et al. | 501/94 |

OTHER PUBLICATIONS

A.G. Gesing, G. Burger, and E. Luce; N. Claussen, S. Wu, and N.A. Travitzky, "Preparation and Characterization of Reaction–Bonded Aluminum Oxide (RBAO) Matrix SiC Particulate Filler Composites", *Ceram. Eng. Sci. Proc.* 11[7–8] pp. 821–841 (1990), no month.

Suxing Wu, Dietmar Holz and Nils Claussen, "Mechanisms and Kinetics of Reaction–Bonded Aluminum Oxide Ceramics", *J. Am. Ceram. Soc.* 76[4]970–80 (1993), no month.

Nils Claussen and Suxing Wu, "Processing and Properties of Reaction–Bonded $Al_2O_3$(RBAO) and Mullite Ceramics", *Ceramic Powder Science IV* no month or date available.

*Primary Examiner*—Mark L. Bell
*Assistant Examiner*—Louis M. Troilo
*Attorney, Agent, or Firm*—Benesch, Friedlander, Coplan & Aronoff LLP

[57] ABSTRACT

This invention is directed to ceramic metal composite useful as a refractory and having improved abrasion, corrosion, and oxidation resistance. The ceramic metal composite of the present invention is comprised of ceramic refractory aggregate, metal particulate, and a nonaqueous binder wherein the ceramic refractory aggregate, metal particulate, and binder residuals react to form a three-dimensional ceramic-metal matrix. The ceramic-metal matrix is further stabilized by bonds between the metal particulate, reaction products of the metal particulate, and the ceramic refractory aggregate.

5 Claims, 1 Drawing Sheet

HIGH DENSITY CERAMIC METAL COMPOSITE EXHIBITING IMPROVED MECHANICAL PROPERTIES

BACKGROUND OF THE INVENTION

This invention relates to a high density ceramic metal composite exhibiting improved mechanical properties and useful as a refractory for producing slide gate plates, nozzles, and the like. More particularly, this invention is directed to a ceramic metal composite which is derived from a specific formulation that may be fired at low temperatures to produce a ceramic metal composite of relative high density and which exhibits improved abrasion, corrosion, and oxidation resistance.

Ceramic refractories are useful as components for applications requiring good resistance to thermal shock, corrosion, and erosion when in contact with molten metal. Such components may be used in control means for regulating the flow of molten metals in molten metal transfer systems, for example, in the manufacture and handling of steel. Such uses include slide gates, sub-entry nozzles, and ladle shrouds. Slide gates are used for controlling the flow of molten metal from a ladle or tundish. Generally, slide gate systems consist of a fixed nozzle attached to or within a movable plate. The flow of molten metal is controlled by moving the movable plate to fully or partially align openings. During shutoff, the openings are misaligned. The principal advantages of the slide gate system over a conventional stopper rod system are its improved reliability to shutoff and ability to modulate molten metal flow. However, even the best of certain refractory systems, such as high alumina slide gate systems, are inadequate for certain molten metals, such as low-carbon, high manganese steel grades. These corrosive steel compositions will seriously attack the bonding media used in most slide gate refractories.

Historically, three main types of bond systems have been employed in manufacturing slide gate plates, nozzles, and similar shaped refractory articles. These three main types of bond systems are oxide bond, carbon bond, and resin bond. Conventionally-fired, oxide-bonded refractory compositions are fired in air at a temperature sufficient to cause sintering and mineralization of the fines. For alumina-based products, the primary bond phase is mullite which requires about 5–10% of silica in the composition. However, silica reacts readily with components of some steel grades resulting in rapid corrosion. Magnesia-based products exhibit very good corrosion resistance but have low thermal shock resistance and high thermal expansion which limits the use of such products to smaller articles.

Carbon-bonded refractory compositions are fired in a reducing atmosphere at a temperature sufficient to convert all hydrocarbon components to carbon and to at least partially convert silicon metal to carbide by reaction with the carbon. Carbon-bonded products generally exhibit better thermal shock resistance and better corrosion resistance than oxide-bonded products. However, the solubility of silicon carbide bond in steel contributes to corrosion, and oxidation of the carbon/carbide bond contributes to accelerated abrasion of the refractory article.

Resin-bonded refractory compositions are simply heated to a temperature sufficient to volatilize the resin solvents and polymerize the resin. Resin-bonded products contain a metallic additive, usually aluminum, which will react with the carbon to form a high strength aluminum carbide bond to replace the resin bond which decomposes during high temperature use. This high purity bond maximizes corrosion resistance. The disadvantage of resin-bonded products is the oxidation of the resin bond at low temperatures. When the aluminum metal melts, it reacts with carbon in the composition or oxygen from the air to form a strong bond and slow further oxidative degradation of the product. However, at lower temperatures, the resin bond oxidizes with little or no development of a secondary bond phase from the metal and rapid wear can result from abrasion.

Other methods for manufacturing refractory articles having high corrosion and abrasion resistance have been considered, such as the manufacture of dense ceramic products. One approach includes establishing a molten pool of aluminum covered with a thick layer of finely divided magnesium silicate particulate. Molten aluminum is transported through the particulate layer wherein it is partially oxidized by the oxidation-reduction of aluminum and magnesium silicate as well as oxidation by atmospheric oxygen. The process ultimately yields a composite of multiple oxide phases and metal phases. The reaction tends to be slow and oxidation is promoted by means of an alkali metal oxide.

There have also been attempts to produce ceramic structures more nearly approximating the net shape of the desired article by using particulate precursor metal and air oxidation. For example, particulate aluminum or aluminum alloy is combined with a metallic oxide fluxing agent, and optionally, a particulate filler refractory. The mixture is oxidized to convert the aluminum to corundum. However, a generally porous structure is developed which has intrinsically low strength properties.

Much attention has been paid and considerable efforts have been devoted to the fabrication of ceramic articles, including the manufacture of ceramic articles by in-situ oxidation of precursor metals. However, these previous attempts have been lacking in one or more respects with regard to the development of products having structural integrity rendering them useful as components for applications requiring good resistance to thermal shock, corrosion, and erosion when in contact with molten metal. For example, the migration of aluminum from a foil configuration to develop a double-walled ceramic structure severely handicaps an article manufactured in that way from adaption as a structural component for lack of strength. In addition, certain of the fabrication techniques themselves are cumbersome, requiring repetitive coatings of templates or the like interspersed with drying steps. A further deficiency of past approaches using in-situ oxidation of powders, foils, and wires to create ceramic bodies has been the exceedingly poor contact wear and erosion resistance of such bodies. It is the inherent porosity of such products which is responsible for their poor structural and wear properties and which limits the practical utility of such products.

Currently, in the United States market, the majority of the slide gate refractories are composed of ceramic-bonded, carbon-bonded, or resin-bonded high alumina or magnesia material. However, such slide gate refractories do not possess the abrasion, corrosion, or oxidation resistance necessary to withstand long preheating and long holding and teeming times. Such slide gate refractories, therefore, have a short service life in many applications. Further, the process to manufacture some of these slide gate refractories is time-consuming and costly. Therefore, it is apparent that improvements are necessary in the production of ceramic refractories for use in applications requiring good resistance to abrasion, corrosion, and oxidation.

The subject invention overcomes the above limitations and others, and teaches formulation of a ceramic metal composite having improved abrasion, corrosion, and oxidation resistance and which is cost effective.

SUMMARY OF THE INVENTION

In accordance with the present invention, there is provided a ceramic metal composite having improved abrasion, corrosion, and oxidation resistance and which is cost effective.

Further, in accordance with the present invention, there is provided a Refractory composite having improved abrasion, corrosion, and oxidation resistance, the refractory article comprising ceramic refractory aggregate, metal particulate, and a nonaqueous binder, wherein the ceramic refractory aggregate, metal particulate, and binder residuals react to form a three-dimensional ceramic-metal matrix, wherein the ceramic-metal matrix is further stabilized by bonds of the metal particulate, reaction products of the metal particulate, and the aggregate Still further, in accordance with the present invention, there is provided a process for producing a refractory article having improved abrasion, corrosion, and oxidation resistance, the process comprising the steps of:

(a) mixing ceramic refractory aggregate, metal particulate, and a nonaqueous binder to form a composition;

(b) charging the composition into a press cavity die;

(c) subjecting the composition to pressure while in the press cavity die to shape and size the refractory article; and (d) firing the refractory article at a temperature above the melting point of the metal particulate to react ceramic refractory aggregate, metal particulate, and binder residuals to form a three-dimensional ceramic-metal matrix, wherein the ceramic-metal matrix is further stabilized by bonds of the metal particulate, reaction products of the metal particulate, and the aggregate.

The ceramic metal composite of the present invention are found to be particularly useful as refractories as they exhibit improved abrasion, corrosion, and oxidation resistance compared to commercially available refractories. Moreover, the process for producing the ceramic metal composite of the present invention provides the additional advantage of relatively low firing temperatures to produce the ceramic metal composite.

These and other advantages and benefits of the invention will be apparent to those skilled in the art upon a reading and understanding of the following detailed description.

BRIEF DESCRIPTION OF THE DRAWINGS

The subject invention will be described with certain parts, and arrangements of parts in the accompanying drawings which form a part hereof and wherein.

DETAILED DESCRIPTION OF THE PREFERRED EMBODIMENTS

Figure 1:
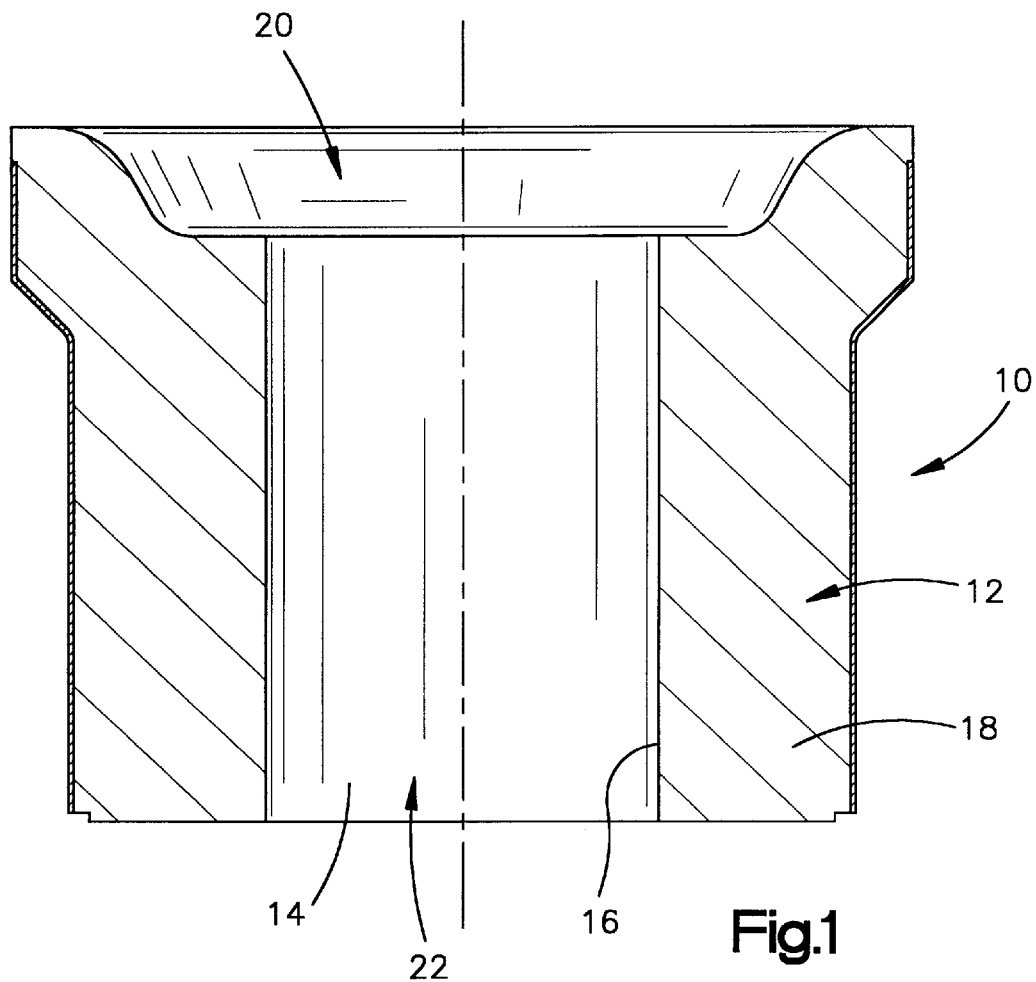
FIG. 1 is a cross-section of a nozzle comprised of a ceramic metal composite according to the process of the present invention showing the various elements of a nozzle.

This invention is directed to ceramic metal composite useful as a refractory and having improved abrasion, corrosion, and oxidation resistance. The ceramic metal composite of the present invention is comprised of ceramic refractory aggregate, metal particulate, and a nonaqueous binder wherein the ceramic refractory aggregate, metal particulate, and binder residuals react to form a three-dimensional ceramic-metal matrix. The ceramic-metal matrix is further stabilized by bonds between the metal particulate, reaction products of the metal particulate, and the ceramic refractory aggregate.

The ceramic metal composite is comprised of any suitable ceramic refractory aggregate material known in the art. More particularly, suitable ceramic refractory aggregate materials include, but are not limited to, metal oxides, borides, nitrides, or carbides of a metal selected from the group consisting of aluminum, magnesium, cerium, hafnium, lanthanum, silicon, neodymium, praseodymium, samarium, scandium, thorium, uranium, titanium, yttrium, and zirconium. Preferably, the ceramic refractory aggregate material is alumina, silica, magnesia, magnesia-alumina, zirconia, aluminum nitride, silicon nitride, silicon carbide, boron carbide, or mixtures thereof. More preferably, the ceramic refractory aggregate material is alumina, magnesia, or mixtures thereof. The ceramic refractory aggregate material is suitably a lattice or array of a bed of particulate, granules, powders, aggregate, fibers, tubes, tubules, pellets, whiskers, or the like, and mixtures thereof. Preferably, the ceramic refractory aggregate is comprised of coarse refractory material and fine refractory material.

The ceramic refractory aggregate material is present in the ceramic metal composite in any suitable amount. Preferably, the ceramic metal composite is comprised of about 60% to about 95% by weight of ceramic refractory aggregate material. More preferably, the ceramic metal composite is comprised of about 85% to about 95% by weight of ceramic refractory aggregate material.

The ceramic metal composite of the present invention is comprised of metal particulate material. The metal particulate material is any suitable material known in the art which will melt at low firing temperatures to form the metallic bond of the ceramic metal matrix. The use of low melting point metal particulate is desired such that a low melting point and a low firing temperature is maintained. More particularly, suitable metal particulate materials include, but are not limited to, aluminum, silicon, magnesium, zirconium, calcium, zinc, tin, titanium, iron, and alloys and mixtures thereof. Preferably, the metal particulate material is comprised of at least 50% aluminum, magnesium, and mixtures thereof. More preferably, the metal particulate material is aluminum or aluminum alloys.

The metal particulate material is present in the ceramic metal composite in any suitable amount. Preferably, the ceramic metal composite is comprised of about 5% to about 30% by weight of metal particulate material. More preferably, the ceramic metal composite is comprised of about 5% to about 15% by weight of metal particulate material.

In addition, the ceramic metal composite is comprised of the reaction products of metal particulate. Preferably, the reaction products of the metal particulate material are oxides, carbides, nitrides, and mixtures thereof.

The ceramic metal composite is further comprised of a nonaqueous binder. The binder should be nonaqueous in order to prevent reacting with the metal particulate material at room temperature. Suitable binders include, but are not limited to, tars, pitches, resins, silicones, ethylene glycol, polyethylene glycol, polyvinyl alcohol, and waxes. Preferably, the binder is a resin binder selected from the group consisting of phenolic based resins, acrylic based resins, epoxy based resins, resorcinol based resins, silicon based resins, furan based resins, and mixtures thereof. For the purposes of the present invention, a phenolic resin is preferred. A resin binder will supply carbon to react with the metal particulate to form high-strength bonds above the melting point of the metal. While a binder with some carbon yield is preferable, it is not necessary.

The binder is present in the ceramic metal composite in any suitable amount which depends on wetting characteristics of the resin with the specific materials, surface area of the composition, and desired forming consistency. If the nonaqueous binder is a resin binder, the ceramic metal composite is comprised of about 2% to about 10% by weight resin binder. More preferably, the ceramic metal composite is comprised of about 4% to about 6% by weight resin binder.

The ceramic metal composite of the present invention is prepared by adding the ceramic refractory aggregate material, the metal particulate, the binder, and other optional ingredients to the bowl of a mixer. The components are mixed for a period of time to form a homogenous composition. In a preferred embodiment, the metal particulate material and the fine ceramic refractory aggregate material are preblended for a period of time. The coarse ceramic refractory aggregate material and the resin are mixed in a mixer. The preblended metal particulate material and fine ceramic refractory aggregate material is added to the mixer and all of the components are mixed to form a homogenous composition. The composition is charged into a press cavity die and pressure is applied to shape and size the ceramic refractory composite.

The ceramic metal composite is then fired to react the ceramic refractory aggregate material, the metal particulate, and the resin binder to form the three-dimensional ceramic metal matrix. The ceramic metal composite is fired at a temperature above the melting point of the metal particulate material. Preferably, the ceramic metal composite is fired at a temperature in the range of the melting point of the metal particulate material to about 2000° F. More preferably, the ceramic metal composite is fired at a temperature of about 1650° F. The ceramic metal composite is fired in the presence of air or nitrogen.

The ceramic metal composite should be fired for period of time such that the metal particulate material does not completely react or oxidize or nitride the metal particulate material in the composite. It is preferable to have unreacted residual metal present in the ceramic metal composite. Preferably, the ceramic metal composite is fired for about one hour to about 15 hours.

In a preferred embodiment, the ceramic metal composite is impregnated with petroleum pitch following the firing of the composite. This step is beneficial to prevent hydration of any nitrides or carbides during long term storage. Further, during high temperature use, the carbon from the pitch reacts with the residual metal to form carbides which improve the strength of the ceramic metal composite.

In a preferred embodiment, after impregnating the ceramic metal composite with petroleum pitch, the composite is heated to bake or partially coke the petroleum pitch to reduce the volatiles content of the composite. The ceramic metal composite is heated to a temperature of at least 550° F. The maximum heating temperature should be below the melting point of any residual metals present in the composite to prevent formation of additional carbides. Further, higher heating temperatures would reduce volatiles and open porosity enough to allow hydration of nitrides and carbides formed during firing.

In one embodiment, the process of the present invention produces ceramic metal composite nozzles as shown in FIG. 1. FIG. 1 shows a cross section and general structure of a nozzle 10. The nozzle is comprised of a ceramic metal composite according to the present invention shown generally as 12. The nozzle has a hollow chamber 14 centrally located in the core of the nozzle and inner wall 16 forming the chamber 14 and an outer wall 18 forming the nozzle proper. The nozzle has an inlet 20 for receiving molten metal and an outlet 22 for discharging molten metal.

Figure 2:
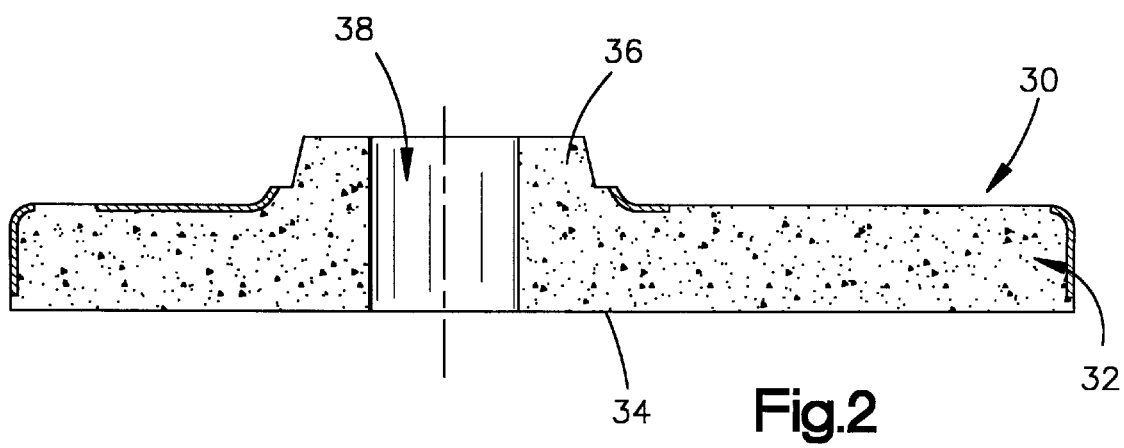
FIG. 2 is a cross-section of a slide gate plate comprised of a ceramic metal composite according to the process of the present invention showing the various elements of a slide gate plate.

In another embodiment, the process of the present invention produces ceramic metal composite slide gate plates as shown in FIG. 2. FIG. 2 shows a cross section and general structure of a slide gate plate 30. The slide gate plate is comprised of a ceramic metal composite according to the present invention as shown generally as 32. The slide gate plate 30 consists of a flat sliding surface 34 which mates with the flat surface of another plate, a boss 36 on the opposite surface to mate with a nozzle, and a bore 38. The plate is designed to fit into the slide gate. The upper plate is stationary, and the lower plate is moveable to fully or partially align the bores. Molten steel flow is controlled from full stream to complete shutoff by the degree of alignment or misalignment of the bores.

The process for producing the ceramic metal composite according to the present invention results in a ceramic metal matrix comprised of combinations of ceramic and metallic bonds. These bonds are formed by (a) low temperature oxidation/reduction reactions between the ceramic refractory aggregate, the metal particulate, and resin binder, (b) the reaction of parent and/or reaction product metals with the atmosphere during firing, and (c) residual metal as either surplus metal particulate in the original composition or as reaction products. Examples of potential reactions wherein aluminum is the metal particulate material are:

(a) ceramic refractory aggregate material contains silica

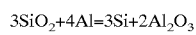

$$3SiO_2 + 4Al = 3Si + 2Al_2O_3$$

(b) ceramic refractory aggregate is silicon nitride

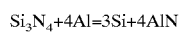

$$Si_3N_4 + 4Al = 3Si + 4AlN$$

(c) ceramic metal composite contains carbon

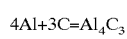

$$4Al + 3C = Al_4C_3$$

(d) ceramic metal composite is fired in presence of air

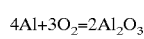

$$4Al + 3O_2 = 2Al_2O_3$$

(e) ceramic metal composite is fired in presence of nitrogen

$$Al + \tfrac{1}{2}N_2 = AlN$$

The present invention is further exemplified in the following examples. The examples illustrate the effectiveness and improved abrasion, corrosion, and oxidation resistance of the ceramic metal composite of the present invention. It is understood that the examples are only illustrative of preferred embodiments according to the present invention wherein the claims set forth the scope of the present invention.

EXAMPLE 1

A ceramic metal composite having the following formulation was prepared:

|  | Weight % |
| --- | --- |
| Coarse Sintered Alumina | 60 |
| Fine Alumina | 18 |
| Ball Clay | 2 |
| Aluminum | 6.7 |
| AlSi Alloy | 12.5 |
| MgAl Alloy | 0.8 |
| Liquid Resole Resin | 5 |

The above components were added to a small laboratory muller mixer and mixed to form a pressable composition. The composition was charged into the press cavity of a hydraulic press and pressed into a brick shape at 6 tons/in$^2$. The brick was cured at about 390° F. The cured brick was then fired at 1650° F. for about 15 hours in a nitrogen atmosphere and then analyzed.

The ceramic metal composite according to the present invention was analyzed for bulk density, apparent porosity, abrasion volume, and corrosion ratio. Bulk density and apparent porosity were measured by ASTM C 830, the American Standards Test Methods. Abrasion volume was measured using ASTM C 704. The corrosion ratio was measured by spinning samples in molten iron covered with a layer of synthetic slag. The starting slag chemistry was 8.5% $SiO_2$, 2.4% $Al_2O_3$, 0.9% $Fe_2O_3$, 21.2% $Fe_3O_4$, 31.7% CaO, 1.6% MgO, 14.8% $MnO_2$, 0.6% $SO_3$, 12.5% $CaF_2$, and 5.8% loss on ignition. The iron temperature was from about 2950° F. to about 3050° F. Samples of a commercially available, resin-bonded, alumina-carbon product, marketed and sold under the trademark MARATHON AC-817, manufactured by North American Refractories Company, was included in the test as a standard for comparison. After running the test, the samples were cut lengthwise and the erosion at the iron-slag interface was measured. The ratio of erosion for the test sample to the standard is recorded. A lower value indicates better resistance to corrosion. The results of the tests are shown in Table 1 below.

TABLE 1

|  | Example 1 | Commercial Resin-Bonded Product (Typical Values) |
| --- | --- | --- |
| Bulk Density, g/cm$^3$ | 2.96 | 3.15 |
| Apparent Porosity, % | 12 | 7 |
| Abrasion Volume, cm$^3$ | 1.8 | 3.5 |
| Corrosion Ratio | 109 | 100 |

The test results demonstrate that the ceramic metal composite according to the present invention has very good abrasion resistance. The ceramic metal composite according to the present invention had much better abrasion resistance than the commercial resin-bonded, alumina-carbon product. The ceramic metal composite according to the present invention and the commercial resin-bonded product both demonstrated good corrosion resistance.

EXAMPLE 2

A ceramic metal composite having the following formulation was prepared:

|  | Weight % |
| --- | --- |
| Coarse Sintered Magnesia | 60 |
| Fine Alumina | 27.5 |
| Ball Clay | 2 |
| Fine Aluminum Powder | 7 |
| Fine Silicon Powder | 3.5 |
| Liquid Novolac Resin | 5 |

The above components were added to a small laboratory muller mixer and mixed to form a pressable composition. The composition was charged into the press cavity of a hydraulic press and pressed into a brick shape at a pressure of 6 tons/in$^2$. The brick was cured at about 390° F. The cured brick was then fired at 1550° F. for about 1 hour in air and then analyzed.

The ceramic metal composite according to the present invention was analyzed for bulk density, apparent porosity, abrasion volume, and abrasion volume after oxidation at 1100° F. and then compared to a commercially available carbon-bonded, $Al_2O_3$—$ZrO_2$—$SiO_2$—C product, marketed and sold under the trademark ALZ-309N, manufactured by North American Refractories Company, and a commercially available resin-bonded, alumina-carbon product, marketed and sold under the trademark MARATHON AC-817, manufactured by North American Refractories Company. Bulk density and apparent porosity were measured by ASTM C 830. Abrasion was measured with the ASTM C 704. The effect of oxidation was tested by measuring abrasion after oxidation at 1100° F. for 10 hours. A modification of the ASTM C 704 was used to measure abrasion. The quantity of SiC abrading media was reduced from 1000 g to 250 g and the air pressure was reduced from 65 psi to 45 psi so that the abrasion would be limited, as much as possible, to the oxidized zone. The results of the test are shown in Table 2 below.

TABLE 2

|  | Example 2 | Commercial Carbon-Bonded Product (Typical Values) | Commercial Resin-Bonded Product (Typical Values) |
| --- | --- | --- | --- |
| Bulk Density, g/cm$^3$ | 2.91 | 3.05 | 3.15 |
| Apparent Porosity, % | 15 | 8 | 7 |
| Abrasion Volume, cm$^3$ | 5.4 | 6.5 | 3.5 |
| Abrasion Volume after Oxidation at 1100° F., cm$^3$ | 1 | 24 | 13 |

The abrasion resistance of the ceramic metal composite according to the present invention was in the range of the commercial products. However, the abrasion after oxidation for the ceramic metal composite according to the present invention was much lower than the commercially available products demonstrating superior oxidation resistance as compared to the commercially available products.

Typically, carbon-bonded and resin-bonded products suffer from damage by oxidation and such oxidation is especially detrimental at lower temperatures where the carbon or resin bond oxidizes and no secondary bond phase forms. In the ceramic metal composite of the present invention, a metal bond, along with some oxide and carbide bonds, is formed by firing the composite above the melting point of the metal. This provides the strength required through the low to intermediate temperature region and does not require the high firing temperatures necessary for sintering and mineralization in conventional ceramic-bonded products.

EXAMPLE 3

A ceramic metal composite having the following formulation was prepared:

|  | Weight % |
|---|---|
| Coarse Sintered Magnesia | 60 |
| Fine Alumina | 28 |
| Ball Clay | 2 |
| Fine Aluminum Powder | 10 |
| Liquid Novolac Resin | 5 |

Using a large-scale production mixer, the above components were mixed to form a pressable composition. The composition was then pressed into small ladle plates. The plates were cured at about 390° F. The cured plates were then fired at 1650° F. for about 15 hours in air. The plates were impregnated with petroleum pitch and coked at about 900° F. to reduce the volatiles content.

The ceramic metal composite plates according to the present invention and a commercially available resin-bonded, alumina-carbon slide gate plate, marketed and sold under the trademark MARATHON AC-438, manufactured by North American Refractories Company, were used for multiple heats in ladle slide gates. The plates were tested using only non-corrosive steel grades. Stroke path wear, which is typically the limiting factor in plate life, was measured after use. The results are shown in Table 3 below.

TABLE 3

|  | Example 3 | Commercial Resin-Bonded Product (Typical Values) |
|---|---|---|
| Average heats | 4.9 | 4.8 |
| Average stroke wear, mm/heat | 3.1 | 4.6 |

In this case, stroke path wear was primarily due to mechanical abrasion of the plate surface. The ceramic metal composite plate according to the present invention had much better stroke wear results than the commercially available resin-bonded plate, indicating improved abrasion resistance.

EXAMPLE 4

A ceramic metal composite having the following formulation was prepared:

|  | Weight % |
|---|---|
| Coarse Sintered Magnesia | 60 |
| Fine Alumina | 28 |
| Ball Clay | 2 |
| Fine Aluminum Powder | 10 |
| Liquid Novolac Resin | 5 |

Inserts of sufficient size to cover the wear zone (the bore and stroke path) of a large ladle plate were prepared. The inserts were cured at about 390° F. The cured inserts were then fired at 1650° F. for about 15 hours in air. The inserts were impregnated with petroleum pitch and coked at about 900° F. to reduce the volatiles content. The full plate was then fabricated by casting around the insert with a high alumina castable.

The plates with ceramic metal inserts according to the present invention and two commercially available resin-bonded, alumina-carbon products, marketed and sold under the trademarks MARATHON AC-817 and MARATHON AC-438, both manufactured by North American Refractories Company, were used for multiple heats in ladle slide gates. The inserts were tested using non-corrosive steel grades and corrosive steel grades. Stroke path wear was measured after use. The inserts covered the entire stroke path of the plate surface so wear measurements relate only to the insert material. The results are shown in Table 4 below.

TABLE 4

|  | Example 4 | Commercial Resin-Bonded Product A (Typical Values) | Commercial Resin-Bonded Product B (Typical Values) |
|---|---|---|---|
| Non-Corrosive Steels |  |  |  |
| Average heats | 4.1 | — | 4.8 |
| Average stroke wear, mm/heat | 6.8 | — | 7.4 |
| Corrosive Steels |  |  |  |
| Average heats | 2.6 | 1.8 | — |
| Average stroke wear, mm/heat | 6.2 | 17.0 | — |

For the non-corrosive steel grades, the ceramic metal insert according to the present invention and the commercially available resin-bonded product had similar results for wear resistance. For the corrosive steel grades, the wear rate of the ceramic metal insert according to the present invention was not affected by the corrosive steel indicating high resistance to corrosion. In contrast, the wear of the commercially available resin-bonded product was accelerated by corrosion of the plate surface in the stroke path.

The above results demonstrate the ceramic metal composite of the present invention are widely applicable for use as refractory material. The ceramic metal composite of the present invention is particularly useful for applications such as slide gate plates which required high resistance to corrosion by liquid steel and its alloy elements or oxide inclusions, and high resistance to mechanical wear.

Compared to conventionally-fired, oxide-bonded ceramics, the firing temperature is much lower for the ceramic metal composite of the present invention, thus reducing the time and cost of processing. However, even with the low firing temperatures, very good strength and wear resistance is achieved.

Resin-bonded products currently used for slide gate applications suffer from oxidation of the carbon or hydrocarbon bond phases which severely weaken the structure and contribute to high abrasion losses. The bond of the ceramic metal composite of the present invention does not suffer this type of degradation and yet provides the high corrosion resistance needed for many applications.

An important advantage of the present invention over other commercial products and processes is that the present invention uses processes which are more conducive to large, scale, lower cost production of shapes for refractory articles.

While various embodiments of a ceramic metal composite and process for preparing such a ceramic metal composite have been disclosed, it should be understood that modifications and adaptations thereof will occur to persons skilled in the art. Other features and aspects of this invention will be appreciated by those skilled in the art upon reading and comprehending this disclosure. Such features, aspects, and expected variations and modifications of the reported results and examples are clearly within the scope of the invention where the invention is limited solely by the scope of the following claims.

What is claimed is:

1. A metal/ceramic composite for use in forming refractory slide gates for use in high temperature, corrosive environments, comprised of the following components by weight:

a) about 78% alumina;

b) about 2% ball clay;

c) about 6.7% aluminum;

d) about 13.3% metal alloy; and, e) about 5% by weight liquid resole resin binder;

wherein said components are pressed into a shape, cured at a temperature of about 390 degrees Fahrenheit and fired at a temperature of about 1,650 degrees Fahrenheit in a nitrogen atmosphere for about 15 hours, and wherein said metal/ceramic composite having an abrasion volume of about 1.8 cm$^3$.

2. A metal/ceramic composite for use in forming refractory slide gates for use in high temperature, corrosive environments, comprised of the following components by weight:

a) about 60% sintered magnesia;

b) about 27.5% alumina;

c) about 2% ball clay;

d) about 7% aluminum powder;

e) about 3.5% silicon powder; and, f) about 5% liquid novolac resin binder;

wherein said components are pressed into a shape, cured at a temperature of about 390 degrees Fahrenheit and fired at a temperature of about 1,550 degrees Fahrenheit in air for about 1 hour, and wherein said metal/ceramic composite having an abrasion volume after oxidation at 1,100 degrees Fahrenheit of about 1 cm$^3$.

3. A metal/ceramic composite for use in forming refractory slide gates for use in high temperature, corrosive environments, comprised of the following components by weight:

a) about 60% sintered magnesia;

b) about 28% alumina;

c) about 2% ball clay;

d) about 10% aluminum powder; and, e) about 5% liquid novolac resin binder;

wherein said components are pressed into a shape, cured at a temperature of about 390 degrees Fahrenheit and fired at a temperature of about 1,650 degrees Fahrenheit in air for about 15 hours, and wherein said composite further comprises petroleum pitch and is coked at about 900 degrees Fahrenheit.

4. The metal/ceramic composite of claim 3, wherein said composite has an average stroke wear of about 3.1 mm after use.

5. The metal/ceramic composite of claim 3, wherein said composite has an average stroke wear of about 6.2 mm after use.

* * * * *